May 8, 1956 H. BRÜCKNER ET AL 2,744,994
ELECTRIC BAKING, ROASTING AND COOKING APPARATUS
Filed Aug. 4, 1952 6 Sheets-Sheet 1

Inventors:
Harry Bruckner
Albert Heitmann
By Watson, Cole, Grindle & Watson
ATTORNEYS

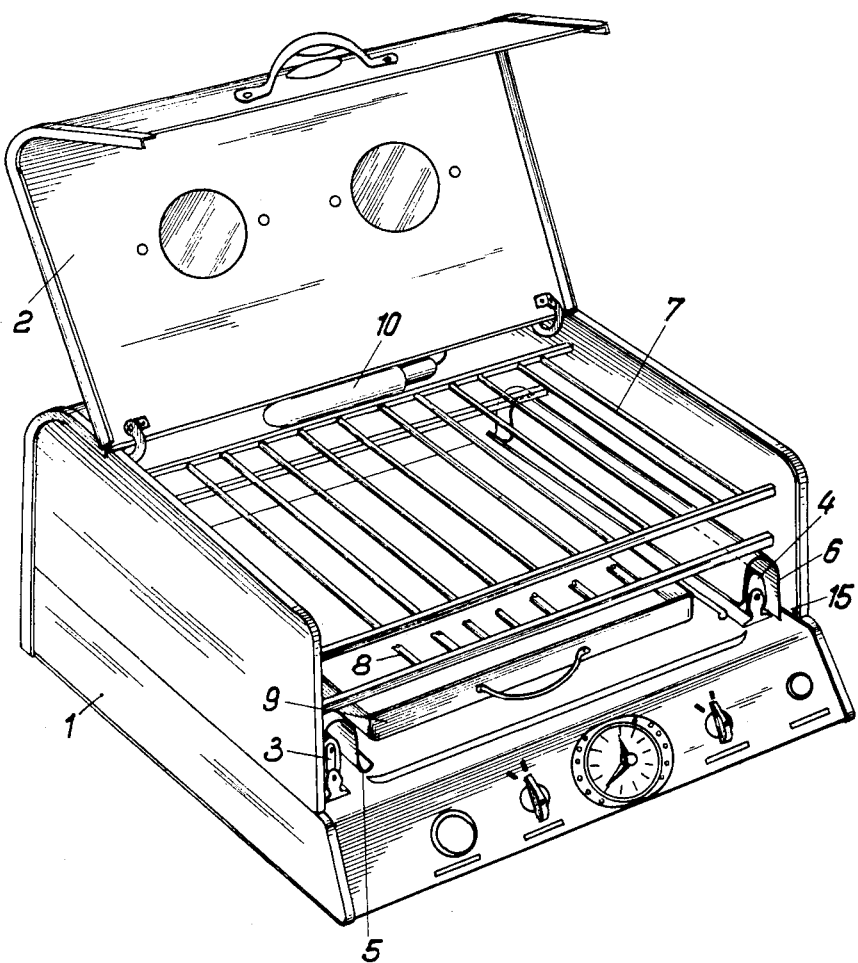

May 8, 1956  H. BRÜCKNER ET AL  2,744,994
ELECTRIC BAKING, ROASTING AND COOKING APPARATUS
Filed Aug. 4, 1952  6 Sheets-Sheet 3
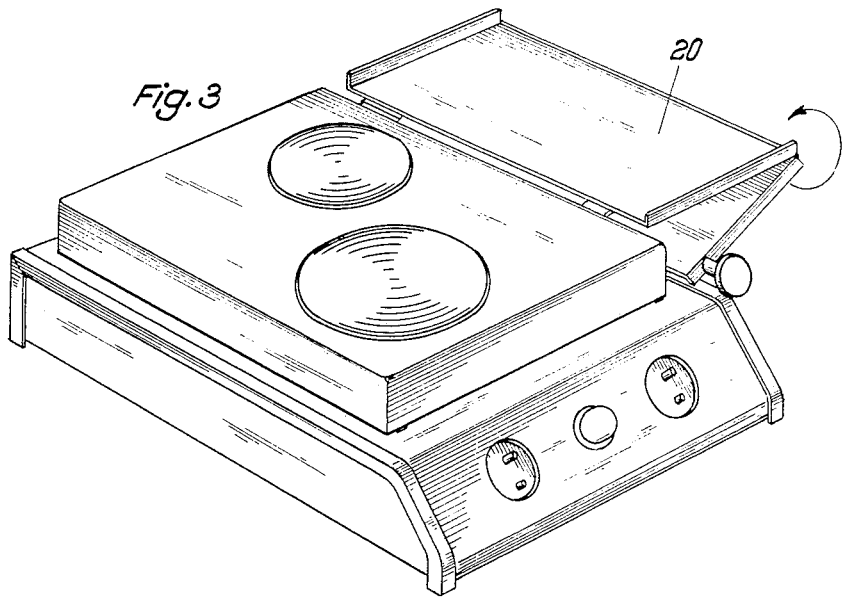
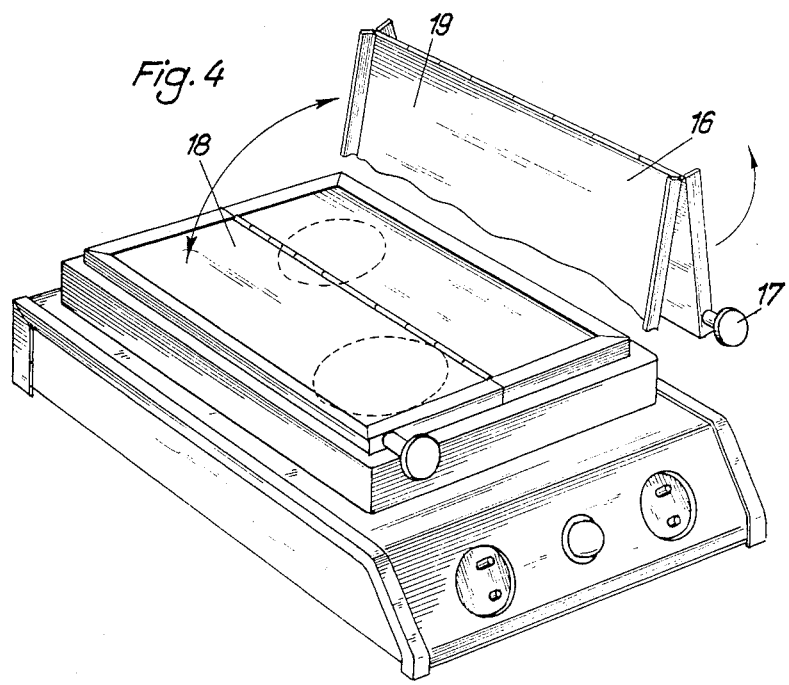
Inventors:
Harry Bruckner
Albert Heitmann
By Watson, Cole, Grindle & Watson
ATTORNEYS May 8, 1956　　　　H. BRÜCKNER ET AL　　　　2,744,994
ELECTRIC BAKING, ROASTING AND COOKING APPARATUS
Filed Aug. 4, 1952　　　　　　　　　　　　6 Sheets-Sheet 4

Inventors
Harry Bruckner
Albert Hutmann
By Watson, Cole, Grindle & Watson
ATTORNEYS May 8, 1956  H. BRÜCKNER ET AL  2,744,994
ELECTRIC BAKING, ROASTING AND COOKING APPARATUS
Filed Aug. 4, 1952  6 Sheets-Sheet 6

Inventors
Harry Bruckner
Albert Heitmann
By Watson, Cole, Grindle & Watson
ATTORNEYS

United States Patent Office 2,744,994
Patented May 8, 1956

2,744,994

ELECTRIC BAKING, ROASTING, AND COOKING APPARATUS

Harry Brückner, Berlin-Wilmersdorf, and Albert Heitmann, Berlin, Germany, assignors to Arista William R. P. Schulz G. m. b. H., Osterholz-Scharmbeck, Germany Application August 4, 1952, Serial No. 302,566

Claims priority, application Germany August 6, 1951

4 Claims. (Cl. 219—35)

Heretofore known types of electric stoves for roasting and baking purposes are inconvenient for the housewife as regards both their space distribution and their operation.

In most known stoves, the heating plates are arranged on top and the so-called baking and roasting oven is arranged underneath them. Because of this arrangement, the housewife has to bend, crouch or kneel down in order to attend to the oven. Furthermore, this known arrangement of the oven prevents the space underneath the cooking plate from being put to more advantageous use. A further disadvantage consists in the fact that the food being roasted or baked has to be pulled out for inspection during the roasting or baking process, which is detrimental more especially in the case of baking, since the cake or the like may collapse due to the admission of cold air at the door. It has not heretofore been possible to observe the roasting or baking process without opening the door.

In roasting, also, it is found that basting of the meat and preparation of the gravy cannot be effected unless the dripping pan is pulled about half way out. A further disadvantage consists in the fact that cooking and baking ovens are mostly so designed that either top or bottom heating can be switched on separately, so that if they are switched on wrongly or at the wrong times the food being baked or roasted may be spoiled. This applies also to table stoves, which have come into use to a great extent during recent years.

These stoves consist of a baking oven on which heating plates are mounted at the top. The disadvantages of this arrangement are known, for instance that pans and the like on the heating plates are much too high for the housewife, and comfortable working and observation of the cooking process is thereby rendered difficult.

Lastly, known types of roasting ovens are not constructed so as to take full advantage of the fact that roasting ovens can also be successfully used for cooking and steaming operations (hot air method).

In the case of stoves employing the heretofore known methods, the housewife is compelled to open the oven from time to time in order to see how the cooking process is progressing. Each time the door is opened, the inside of the oven is cooled. This increases the current consumption and furthermore wastes time.

Furthermore, previously known types of oven do not enable cooking accessories such as vessels, crockery and the like, cooking implements, cutlery, dishing-up plates and so forth to be accommodated in a receptacle directly connected to the oven. For accommodating such articles it was necessary to provide separate articles of furniture located in other parts of the kitchen. The housewife or cook was therefore compelled to go away from the stove in order to carry out preparation work.

A further disadvantage of the above mentioned known constructions consists in the fact that the baking and roasting ovens are made with double walls, consisting for instance in most cases of enamelled deep-drawn plate metal, and the heating elements are arranged between the outer and inner wall (insulation space). Because of this arrangement, and because of the material used, the heating of the air inside the roasting and baking oven takes considerable time and current. Thus for instance heating to 200° C. (baking and roasting temperature) takes about 30 minutes. Accommodating the heating elements inside a wall having an insulating effect also produces the result that when the current supply is switched off—after the baking or roasting operation has been completed—there is still a considerable supply of heat (stored heat), resulting from the fact that convection of heat is employed and not direct heat radiation (cf. Franz Lauster, "Elektrowarme-Technik," vol. 2 (1950), page 37). In most cases, no use is made of this stored heat. This is due to the fact that usually the housewife or cook switches off only when she is sure that the end of the cooking, baking or roasting process is imminent. Experience has shown that instructions in cookery books concerning the use of stored heat make little difference to this.

The disadvantages, briefly mentioned above, of electric baking and roasting ovens of heretofore known design are avoided by the electric baking, roasting and cooking apparatus according to the invention. The invention consists essentially in that an apparatus formed in the manner of a baking and roasting oven is provided of which the internal space, filled with air, is heated directly by means of heating elements arranged inside it and that the inner wall of the apparatus, which preferably has a parabolically curved surface, has reflecting characteristics, for instance being made of aluminum or aluminum alloy, or being suitably lined, with the result that the necessary even temperature for baking, roasting, boiling and steaming can be obtained by means of a one-way switching device.

In this connection it is to be noted that localised overheating of the material being cooked, due to excess heat of conduction, is entirely avoided, one result of this being that for instance fat cannot turn black or burn, and therefore fat is saved.

The casing is not subjected to overheating, and if aluminum or an aluminum alloy is used the invention produces the further advantage that no impairment of the flavour or odour can take place, since aluminum and its alloys have no effect on odour. The very good thermal conductivity of aluminum is also of advantage in the processes in question; the heating time of the apparatus is considerably reduced, and the air in the device is heated more rapidly by the reflection from the aluminum, so that a substantial saving of current is effected. The apparatus is easy to keep clean, since it has no devices installed inside it which would render this difficult.

According to a further feature of the invention, the heating elements are arranged in the vicinity of the side walls of the apparatus, in the form of elongated bodies, and by means of a protective plate or the like are protected against being struck by splashed water or the like, in such a manner that direct contact between the heating elements and the air inside the apparatus is not prevented. These elements have a very low power consumption (in practice it has been found that one kilowatt is amply sufficient) but are of such dimensions, relatively to the volume of air inside the apparatus, that they ensure the necessary even temperature for all operations such as roasting, baking, steaming, sterilising, preserving and the like.

The construction according to the invention enables a time switch to be installed, adjustment of which enables cooking, roasting or baking operations to be effected completely automatically, rendering the presence of a cook unnecessary. This makes things very much easier for the housewife or for an unmarried person who goes out to work; such a person can spend the whole day away from home without taking any action in order to prepare a meal, and on returning home will find the meal cooked and ready. In the present state of the art there is no difficulty in obtaining time switches which will turn on the heat a certain time after the operator has departed, and will then terminate the cooking process after a further set interval of time.

It is also advisable according to the invention to arrange a plurality of insertable grids, plates or pans one above the other in tiers, so that for instance it is possible optionally either to bake on two plates at the same time or to bake on an upper plate and roast in a dripping pan inserted at the bottom, without any possibility that the two foods will impair one another's flavour or odour.

In the new roasting oven, suitable inserted members, such as grids, roasting and baking plates and the like ensure that the food being roasted and baked is surrounded on all sides by heated air and thus thoroughly cooked, while at the same time direct contact between the food being roasted or baked and heated metal surfaces is avoided.

A further feature of the invention consists in the fact that preferably, after the removal of one or more inserted members in the form of grids or plates the apparatus is suitable for accomodating normal cooking vessels, crockery made of fireproof glass, stone, ceramic, iron or aluminium ware or a multi-part dish or casserole, whereby the apparatus can be used also for the steaming or cooking of meat, fish, green vegetables, mushrooms, potatoes and the like in their own juice, i. e. without the addition of water.

Thus, a great many cooking operations which formerly took place on the hot plates are now effected in the roasting device according to the invention, under substantially more favourable conditions as regards the flavour and nutritional value of the foods: loss of soluble components, and burning, are no longer possible.

The cooking plates therefore are now required only for boiling water, and for cooking soups, leguminous vegetables, dried vegetables and the like.

The substantially better use made of the roasting oven by means of new design thereof enables it, in combination with for instance two cooking plates, to give the same performance as a four-plate stove (full-size kitchen range).

According to the invention the apparatus is provided with a cover, having a downwardly directed edge, which enables the casing to be closed at the front and on top. In addition to inspection holes (glass windows or the like) vapour openings are also provided in the cover, whereby it is possible to test for completeness of cooking.

By means of the inspection windows and the vapour openings, the need to pull the food out during the roasting and/or baking process is avoided. The food remains in the oven until it is ready to eat, and if necessary may even be dished up in the oven after the top part has been lifted.

A further important feature of the invention is that a moisture-proof electric lighting device is provided inside the apparatus in such a manner as to enable the interior to be inspected satisfactorily even if for instance two grids (tiers) are in use.

It has been found advisable to provide an electric lamp, so arranged as to be sealed against moisture, inside the roasting oven. The lamp may be arranged underneath an opening, provided with a glass cover, in the floor-plate and underneath the rear part of the reflecting cover, this part being parabolically shaped. The beams of light proceeding from the lamp are evenly distributed over the interior of the oven by the reflecting parabolic cover, so that under all circumstances the interior of the roasting device can be observed through the inspection holes.

Further details of the invention will appear in the course of the following description of one embodiment, chosen by way of example, with reference to the accompanying drawings, in which:

Figure 2 shows the same device with the cover open;

Figure 3 shows a two-plate cooker belonging to the apparatus according to the invention, in perspective view, the cover being swung back;

Figure 4 shows the same two-plate cooker, with the cover in the half-open and closed positions;

Figure 1:
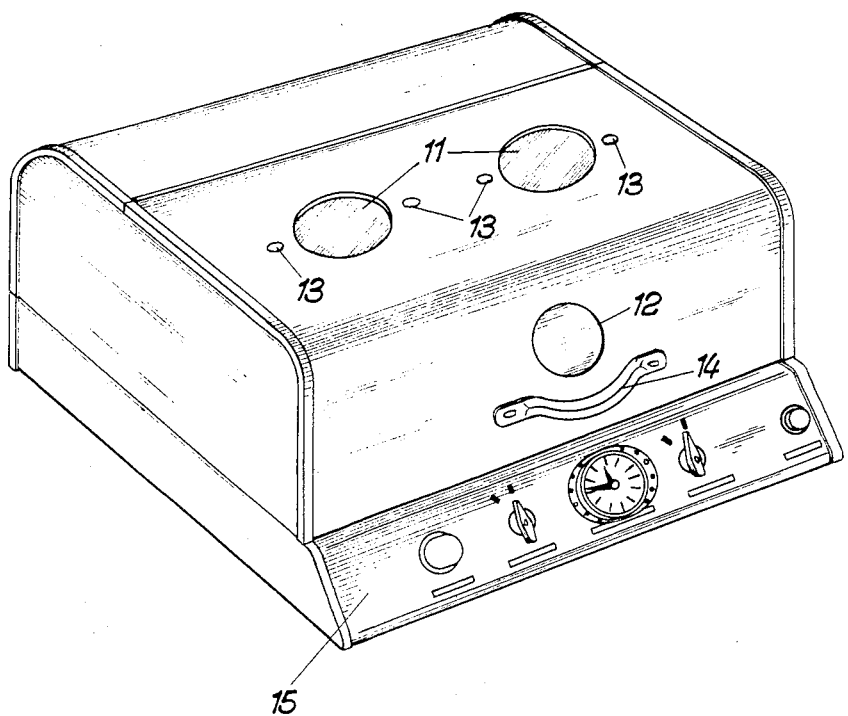
Figure 1 shows the baking, roasting and cooking device in perspective view, the cover being closed.

The baking, roasting and cooking device according to Figures 1 and 2 is in the form of a container provided with a pivotally mounted cover 2. Inside the casing are to be seen heating elements 3 and 4. The protective plates 5 and 6 protect the heating elements against splashes of water and fat. These plates however do not extend right down as far as the bottom of the casing, and thus direct contact with the air inside the casing is maintained. In the casing inserted members in the form of grids 7 and 8 are accommodated above a pan 9, one above the other in tiers. The casing also comprises an electric lighting means 10. Inspection windows 11 and 12 and vapour holes 13 are provided in the cover. A handle 14 is provided on the edge of the cover. The various switches, time switch and the like, the functions of which have been mentioned above, are mounted on a control panel formed by an inclined front plate 15 of the casing.

The casing itself consists of aluminium or an aluminium alloy, whereby the effects mentioned above are produced.

It is obvious that the height of a baking, roasting and cooking device of this kind is relatively small. This height will preferably be made such that after certain tiers or shelves have been removed even relatively large vessels can be accommodated in the device. An important feature of the apparatus according to the invention is that this device is available not only for baking in the normal manner but also for other cooking and steaming operations.

For this reason, in the apparatus according to the invention a two-plate cooker will generally be sufficient. For this, the cooker shown in Figures 3 and 4 has been chosen as an example. Characteristics of this cooker are its low overall height on the one hand, and on the other hand the presence of a covering plate 16 which is of articulated construction and can be adjusted, by suitable manipulation of the handle 17, to the positions shown in Figures 3 and 4, i. e. the closed position 18, the half-open position 19 and the shelf-like position 20.

Figure 5:
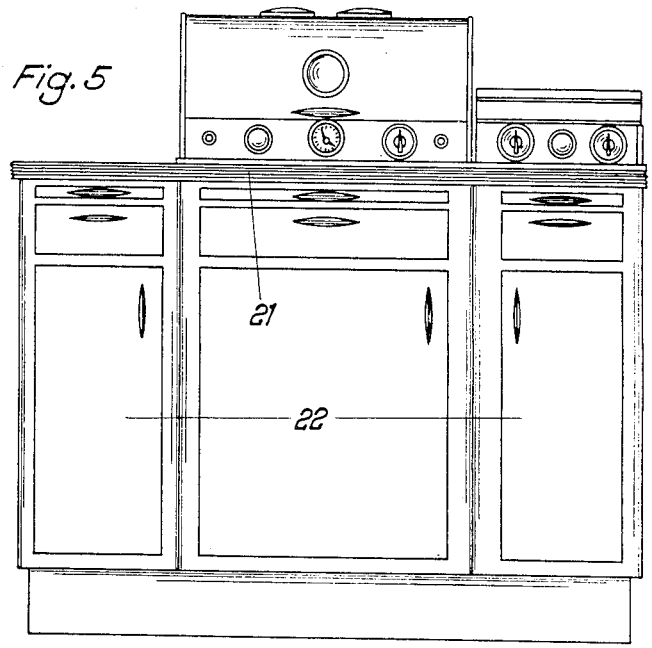
Figure 5 is a view of the whole apparatus, in frontal elevation.
Figure 6:
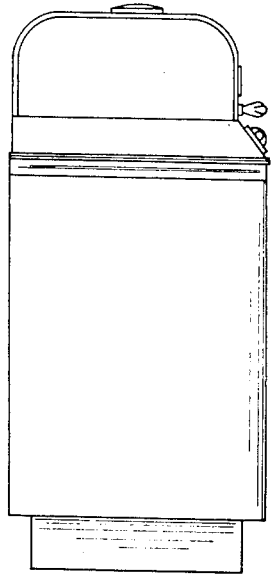
Figure 6 is a view of the whole apparatus, in lateral elevation.

Figures 5 and 6 show the manner in which the baking device and the cooker can be disposed on a supporting surface 21 at a convenient height. The three-part sideboard or cupboard 22 underneath them is used for accommodating cooking and baking gear and accessories. As may be seen from Figures 5 and 6, the space is occupied by a cupboard in which storing and dishing-up plates, cutlery boxes, a spice box, a whisk-holder, shelves for storing vessels, dishes and apparatus such as a mincer, a potato-peeling machine and the like, may be accommodated.

It is also advisable as indicated in Figures 5 and 6 to extend the supporting surface for the baking, roasting and cooking device and the plate cooker laterally, so as to obtain a further storage surface or a supporting surface for further electrical equipment such as for instance a refrigerator, and in addition to render enlargement of the underneath structure in the form of a sideboard.

In order to impart still further advantageous characteristics to the apparatus according to the invention, which improve the general design, according to the invention expedients may be adopted by which the baking, roasting and cooking device and the plate cooker can be made to operate as a single electrical unit, by means of a suitable connecting and switching device, so that when the switch is adjusted to a position for roasting, baking or cooking in the roasting oven only part of the plate cooker is switched on, in accordance with the limits imposed by the electricity authority's regulations.

Similarly, according to a further feature of the invention the current supply and switching arrangements are such that when the whole of the plate cooker is switched on the roasting oven is switched off.

Lastly, according to the invention the arrangement will preferably be made such that both the roasting oven and the plate cooker are provided with contact means which result in mechanical and electrical connection when assembled.

Figure 7:
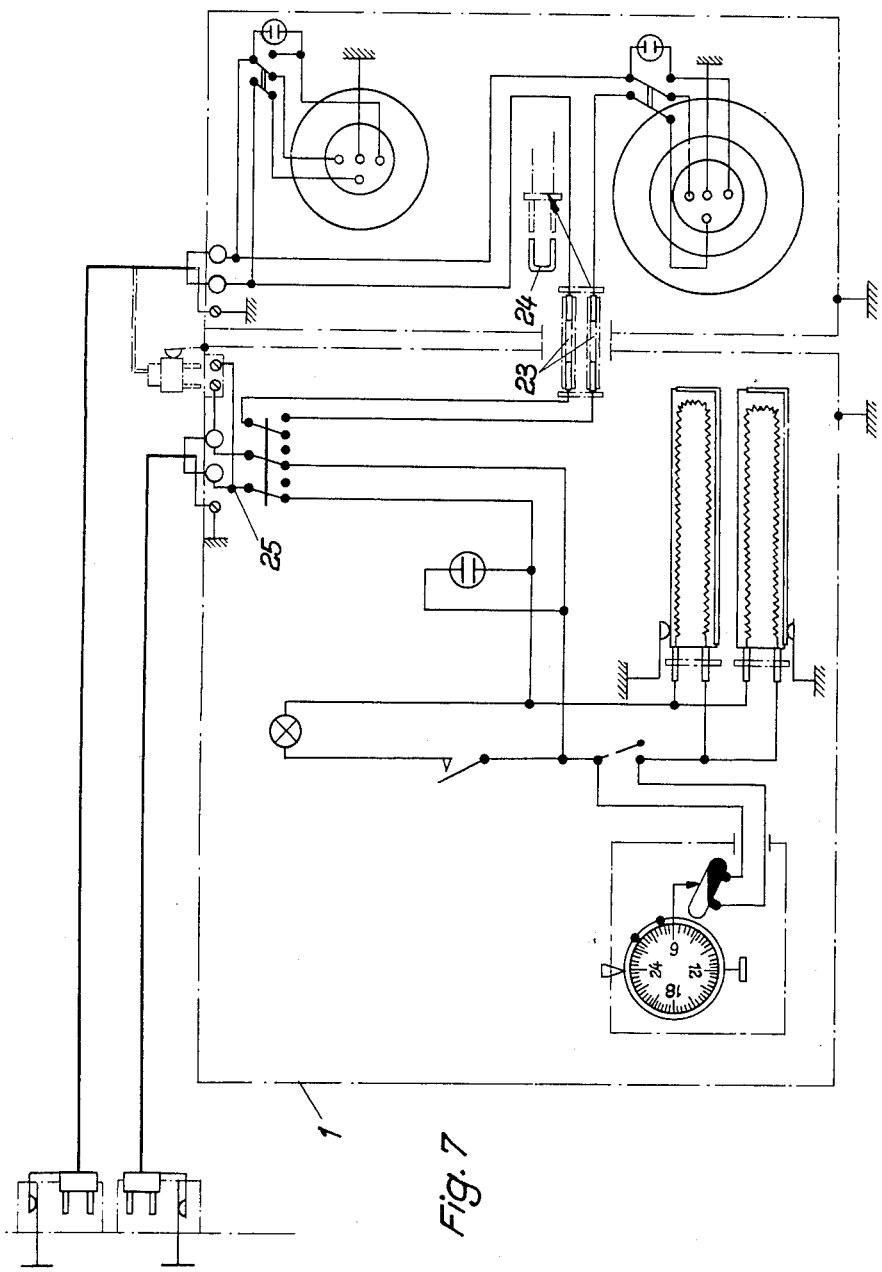
Figure 7 is a circuit diagram.

A circuit arrangement by which this is achieved is shown in the circuit diagram in Figure 7.

The left-hand part of the circuit, framed in broken lines, represents the circuit of the roasting oven 1, while the right-hand part framed in broken lines represents the electric circuit of the plate cooker. The electromechanical connection is between the two parts as shown at 23, and the short-circuiting device is indicated at 24. The switch of the roasting oven, which in Figure 1 is shown arranged on the right-hand half of the control panel near the time switch, appears at 25 in the circuit diagram.

The wiring positions of contacts and the like shown in the circuit diagram are self-explanatory. An important feature is that when the switch 25 is moved from the switched-off position into the switched-on position, on the one hand the roasting oven and on the other hand one cooking plate are switched on, since in this manner the power consumption limit of 2000 watts laid down by the electricity supply regulations will not be exceeded, the roasting oven being normally designed for a power consumption of 1000 watts and each hot plate for about 1000 watts. If it is desired only to use the plate cooker, as a two-plate cooker, then both plate switches must be turned on, whereby the baking oven is automatically switched-off as a result of the wiring and contact arrangements shown in the circuit diagram.

Figure 8:
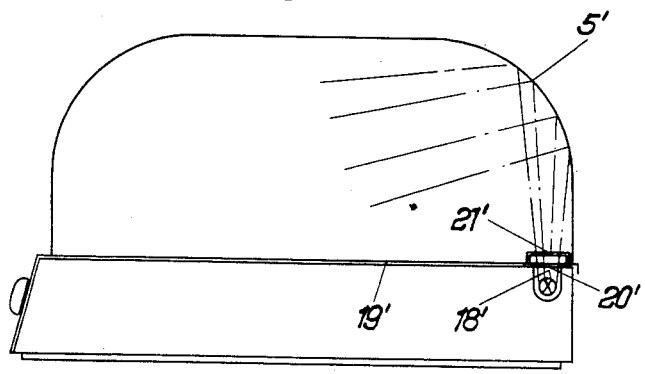
Figure 8 shows the lighting arrangement of the roasting oven, in lateral elevation.
Figure 9:
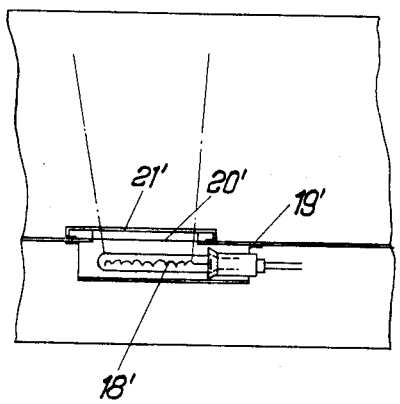
Figure 9 shows the lamp, in frontal elevation.

Figures 8 and 9 show the lamp, the other parts of the roasting device being merely indicated. The lamp is situated underneath the plate 19'. Above it there is an opening 20' in the plate 19', this opening being covered by a glass plate 21' so arranged as to exclude moisture. As can be seen from Figure 8, the lamp emits radiations against the rear parabolic surface 5' whereby the beams of light, as also shown in this figure, are distributed over the space inside the device, more especially since the inner walls are reflecting.

We claim:

1. An electric roasting, baking and cooking apparatus comprising a base, spaced apart substantially vertically disposed side walls on said base, rear, front and top walls on said base formed together in substantially inverted U-shape to provide a hood for said base and side walls and defining with said base and side walls a cooking zone, an elongated heating element positioned inwardly of the side walls and adjacent the lowermost portions thereof, being substantially parallel thereto, the inner surfaces of said base, side walls, front, rear and top walls being of a heat reflective material.

2. The apparatus as in claim 1 wherein said top wall is articulated, said front wall and a front portion of said top wall thus being pivotable to permit access to the interior of said apparatus.

3. The apparatus as in claim 1 wherein a recess is provided in said base adjacent said rear wall, an electric lighting device is mounted in said recess and a moisture-proof cover is provided for said recess, the rays from said lighting device being directed upwardly and being reflected by said hood substantially throughout the interior of said apparatus.

4. An electric roasting, baking and cooking apparatus as claimed in claim 1, which includes a protective cover for each of said heating elements, said covers being of inverted U-shape, having its outer leg somewhat longer than the inner leg, and extending over and partially enclosing said elements, the uncovered portions of said element being the mutually facing portions thereof.

References Cited in the file of this patent

UNITED STATES PATENTS

| 1,001,637 | Gray | Aug. 29, 1911 |
| 1,244,407 | Avedisian et al. | Oct. 23, 1917 |
| 1,341,994 | Nelson | June 1, 1920 |
| 1,815,312 | Heise | July 21, 1931 |
| 2,025,898 | Rhodes | Dec. 31, 1935 |
| 2,048,929 | German et al. | July 28, 1936 |
| 2,341,648 | Parr | Feb. 15, 1944 |
| 2,457,877 | Doner | Jan. 4, 1949 |
| 2,466,409 | Gardes | Apr. 5, 1949 |
| 2,466,859 | Northup | Apr. 12, 1949 |

FOREIGN PATENTS

| 592,986 | Great Britain | Oct. 6, 1947 |
| 946,923 | France | June 17, 1949 |